US006016120A

United States Patent [19]

McNabb et al.

[11] Patent Number: 6,016,120

[45] Date of Patent: Jan. 18, 2000

[54] METHOD AND APPARATUS FOR AUTOMATICALLY AIMING AN ANTENNA TO A DISTANT LOCATION

[75] Inventors: Lea Ann McNabb, Cupertino; David R. Gildea, Menlo Park, both of Calif.

[73] Assignee: Trimble Navigation Limited, Sunnyvale, Calif.

[21] Appl. No.: 09/215,185

[22] Filed: Dec. 17, 1998

[51] Int. Cl.[7] .............................. G01S 5/02; H04B 7/185

[52] U.S. Cl. ...................................... 342/357.06; 342/359

[58] Field of Search .............................. 342/140, 357.06, 342/359, 398, 449, 75; 343/757

[56] References Cited

U.S. PATENT DOCUMENTS

| | | | |
|---|---|---|---|
| 4,384,293 | 5/1983 | Deem et al. | 343/113 |
| 4,599,620 | 7/1986 | Evans | 343/357 |
| 4,881,080 | 11/1989 | Jablonski | 342/357 |
| 5,021,792 | 6/1991 | Hwang | 343/357 |
| 5,146,231 | 9/1992 | Ghaem et al. | 342/419 |
| 5,185,610 | 2/1993 | Ward et al. | 342/357 |
| 5,266,958 | 11/1993 | Durboraw, III | 342/357 |
| 5,268,695 | 12/1993 | Dentinger et al. | 342/357 |
| 5,347,286 | 9/1994 | Babitch | 342/359 |
| 5,398,035 | 3/1995 | Densmore et al. | 343/713 |
| 5,446,465 | 8/1995 | Diefes et al. | 342/357 |
| 5,517,204 | 5/1996 | Murakoshi et al. | 343/765 |
| 5,561,432 | 10/1996 | Knight | 342/357 |
| 5,572,217 | 11/1996 | Flawn | 342/357 |
| 5,617,317 | 4/1997 | Ignagni | 364/449.9 |
| 5,621,793 | 4/1997 | Bedarnek et al. | 380/20 |
| 5,777,578 | 7/1998 | Chang et al. | 342/357 |
| 5,790,075 | 8/1998 | Inugai et al. | 342/359 |
| 5,809,457 | 9/1998 | Yee et al. | 701/220 |

*Primary Examiner*—Thomas H. Tarcza
*Assistant Examiner*—Dao L. Phan
*Attorney, Agent, or Firm*—David R. Gildea

[57] ABSTRACT

An antenna aiming method and apparatus for automatically pointing an antenna to a selected distant location. The antenna aiming apparatus includes a database for storing data for distant locations, an electronic compass for determining a reference azimuth for the local antenna, and a global positioning system (GPS) receiver for determining a local location. A processor computes a pointing direction having an azimuth and an elevation from the local location to the distant location and then computes a horizontal rotation angle between the pointing direction and the reference azimuth and a vertical rotation angle from horizontal to the elevation. An antenna rotator servo-mechanism under processor control rotates the local antenna by the horizontal and vertical rotation angles for pointing the local antenna to the distant location. Optionally, the apparatus further includes electronic roll and pitch inclinometers for providing information to the processor for correcting the horizontal and vertical rotation angles for pitch and roll of the platform.

18 Claims, 3 Drawing Sheets

METHOD AND APPARATUS FOR AUTOMATICALLY AIMING AN ANTENNA TO A DISTANT LOCATION

BACKGROUND OF THE INVENTION

1. Field of the Invention

The invention relates generally to systems for aiming directional antennas and more particularly to a method and apparatus using a global positioning system (GPS) receiver and a compass for automatically aiming a directional antenna to a distant geographical or spatial location.

2. Description of the Prior Art

Most antennas that are used on boats, road vehicles, airplanes, and other mobile platforms necessarily have a wide radiation pattern in order to be able to receive or transmit signals without regard for the directional orientation and geographical or spatial location of platform. For example, marine and vehicle television antennas typically have radiation patterns of 360° in a horizontal plane for receiving television signals from terrestrial television transmitters. Such television antennas are limited by the wide radiation pattern to having a low gain. When the boat or vehicle is near to the television transmitter, the low gain of the antenna is not noticed because the signal-to-noise ratio for the signal received from the transmitter is high. However, when the boat or vehicle is farther away from the television transmitter where the signal-to-noise ratio is lower, the low gain of the antenna degrades or even prevents television reception. Of course, a high gain directional antenna, such as is commonly used in a residence, could be used to increase signal-to-noise. However, such directional antennas must be aimed toward the television transmitter. Each time the platform rotates or the platform moves so that the direction between the antenna and the transmitter changes, the direction of the antenna must be adjusted correspondingly. For receiving satellite television, the limitations are more severe because satellite television signals generally have low signal-to-noise ratios everywhere on the Earth's surface. Common residential satellite television antennas use parabolic dish reflectors that are highly directional and have very high gains in order to compensate for the low signal level of satellite television signals. However, a non-directional marine or vehicle satellite television antenna requires an upward pointing hemispherical radiation pattern for receiving television signals from a satellite transmitter. The hemispherical pattern for satellite reception is even broader than the 360° horizontal pattern for terrestrial reception, resulting in an even lower antenna gain for the satellite television antenna. It is unlikely that a low gain hemispherical antenna could provide enough signal strength for receiving satellite television. Similar limitations exist for other types of signals and for transmitting from a mobile platform as well as receiving.

SUMMARY OF THE INVENTION

It is therefore an object of the present invention to provide a method and apparatus for automatically pointing a directional antenna to a selected distant location without regard for the location and orientation of the platform.

The present invention is a system for automatically pointing a local antenna that is mounted and carried on a mobile platform toward a distant location. The distant location may be the location of a terrestrial, airborne, or satellite transmitter or receiver for which it is desired to receive or transmit signals. Briefly, in a preferred embodiment, the system of the present invention includes a database for storing data for distant locations, an electronic compass for determining a reference azimuth for the local antenna, and a global positioning system (GPS) receiver for determining a local location. A processor computes a pointing direction having an azimuth and an elevation from the local location of the mobile platform to the distant location. Then, the processor computes a horizontal rotation angle between the pointing direction and the reference azimuth and a vertical rotation angle from local horizontal to the desired elevation. An antenna rotator servo-mechanism under processor control rotates the local antenna by the horizontal and vertical rotation angles for pointing the local antenna to the distant location. Optionally, the system further includes electronic roll and pitch inclinometers for providing information to the processor for compensating the horizontal and vertical rotation angles due to roll and pitch of the platform.

An advantage of the antenna aiming method and apparatus of the present invention is that a high gain directional antenna can be used on a mobile platform.

These and other objects of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
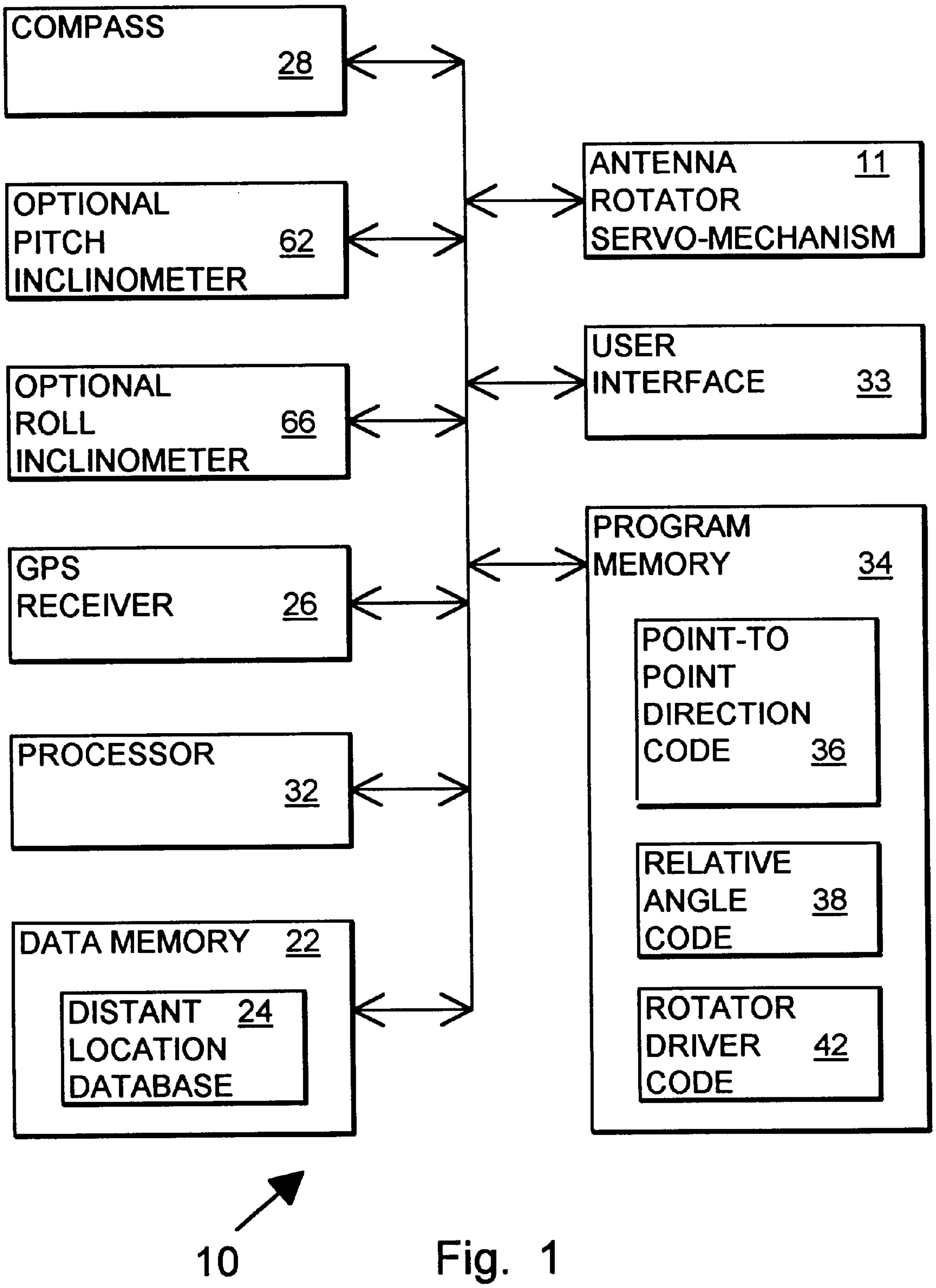
FIG. 1 is a block diagram of an antenna aiming apparatus of the present invention.

FIG. 1 is a block diagram of an antenna aiming apparatus of the present invention referred to by the general reference number 10. The antenna aiming apparatus 10 includes an antenna rotator servo-mechanism 11 for aiming a local directional antenna 12 (FIGS. 3*a,b*) toward a selected distant location in order to maximize signal reception from a transmitter station or maximize signal transmission to a receiver station at the distant location. A mobile platform 14 (FIGS. 3*a,b*), such as a boat, a terrestrial vehicle, an airplane, or a lugged case, carries the antenna aiming apparatus 10 and the antenna 12. The antenna 12 mounts on the rotator 11 which is fixed to the platform 14. The antenna aiming apparatus 10 includes a data memory 22 including a distant location database 24; a global positioning system (GPS) receiver 26; and a compass 28. The distant location database 24 includes data for the locations of the transmitter stations from which it is desired to receive a signal and/or the receiver stations to which it is desired to transmit a signal. Depending upon the application, the distant locations may be stored in the form of two-dimensions of latitude and longitude; or three dimensions of latitude, longitude, and altitude. The GPS receiver 26 determines a local geographical or spatial location for the antenna aiming apparatus 10. The compass 28 determines an azimuth of a reference axis 30 (FIGS. 3*a,b*) for the mobile platform 14. In general, the azimuth determination may be defined in terms of any distant point and the reference axis 30 may have any elevation. However, it is preferable that the azimuth be defined with respect to true North and it is assumed in the following discussion that the reference axis 30 is horizontal when the mobile platform 14 is in normal operation. Preferably, the compass 28 includes a magnetic field sensing device that is sensitive to the Earth's magnetic field for determining a magnetic North based azimuth. Then, the magnetic North based azimuth is converted to a true North based azimuth using a magnetic deviation that is determined from the local location that is determined by the GPS receiver 26 and a stored conversion table for converting the location to the magnetic deviation. The antenna aiming apparatus 10 further includes a processor 32, a user interface 33, and a program memory 34. The processor 32 reads and writes to the data memory 22 and executes instructional codes from the program memory 34 in a conventional manner. The user interface 33 is coupled to the processor 32 for enabling an operator to select a particular distant geographical or spatial location by specifying the latitude, longitude, and altitude for aiming the local antenna 12; to install a particular location into the distant location database 24; to designate mnemonic representations for the locations in the distant location database 24; or to select a particular mnemonic that has been previously designated in order to aim the local antenna 12 to the distant location represented by that mnemonic.

Two and three dimensional embodiments of the antenna aiming apparatus 10 are described below. The two dimensional embodiment is useful for applications where the elevation between the local antenna 12 and distant location is small compared to the directionality of the local antenna 12. Typically, the two-dimensional embodiment of the antenna aiming apparatus 10 is used for receiving and/or transmitting signals when the mobile platform 14 and the distant location are terrestrial. The three-dimensional embodiment is required where the elevation between the local and distant location is greater than the directionality. Typically, the three-dimensional embodiment of the antenna aiming apparatus 10 is used for receiving satellite signals or when the platform 14 is an airplane.

The program memory 34 includes a point-to-point direction code 36, a relative angle code 38, and a rotator driver code 42. In the two-dimensional embodiment, the point-to-point direction code 36 computes an azimuthal pointing direction 44 (FIG. 3*a*) for the azimuth from the latitude and longitude of the local location determined by the GPS receiver 26 to the latitude and longitude of the selected distant geographical location that is stored in the distant location database 24. The relative angle code 38 computes a horizontal (azimuthal) rotation angle 46 (FIG. 3*a*) for the difference between the azimuth of the reference axis 30 determined by the compass 28 and the azimuthal pointing direction 44 computed by the point-to-point direction code 36. The rotator driver code 42 drives the antenna rotator servo-mechanism 11 to rotate the local antenna 12 by the horizontal rotation angle 46 with respect to the reference axis 30, thereby automatically aiming the local antenna 12 toward the selected distant geographical location.

For the case when the distant location is relatively nearby, such the location of a television transmitter, the azimuthal pointing direction 44 clockwise from the direction of true North can be approximated computed from a straightforward application of plane geometry using an equation 1 and a table 1 below.

$$\gamma = \tan^{-1}[\Delta\phi/(\Delta\lambda\text{Cos}\phi)] \quad (1)$$

TABLE 1

DETERMINATION OF AZIMUTH FROM γ

| Azimuth | Δλ direction |
|---|---|
| 270° + γ | W |
| 90° + γ | E |

In the equation 1, $\phi$ is the latitude of the local antenna 12, $\Delta\phi$ is the latitude difference from the local antenna 12 to the distant location with a northerly difference being positive and $\Delta\lambda$ is the longitude difference from the local antenna 12 to the distant location with a westerly difference being positive. The table 1 shows that for a westerly direction (W) from the local antenna 12 to the distant location the azimuthal pointing direction 44 is 270°+γ and for an easterly direction (E) from the local antenna 12 to the distant location the azimuthal pointing direction 44 is 90°+γ.

In the three-dimensional embodiment, the point-to-point direction code 36, in addition to computing the azimuthal pointing direction 44, computes an elevation pointing direction 54 (FIG. 3*b*) with respect to a horizontal plane 55 (FIG. 3*b*) from the latitude, longitude, and altitude determined by the GPS receiver 26 for the local location and the latitude, longitude, and altitude of the selected distant location that is stored in the distant location database 24 and the curvature of the Earth. The relative angle code 38 computes a vertical (elevation) rotation angle 56 (FIG. 3*b*) from the elevation pointing direction 54, in addition to computing the horizontal rotation angle 46. The rotator driver code 38 drives the antenna rotator servo-mechanism 11 to rotate the local antenna 12 by both the horizontal rotation angle 46 and the vertical rotation angle 56, thereby automatically aiming the local antenna 12 toward the selected distant location for a three-dimensional embodiment.

For the case of a geostationary satellite and the local antenna 12 on the surface of the Earth having a latitude $\phi$ and a longitude $\Delta\lambda$ relative to the subsatellite point (the point of the surface of the Earth directly beneath the satellite) on the equator, the elevation angle θ (elevation pointing direction 54) can be computed according to equations 2–4 by using standard spherical and plane trigonometric relationships.

$$\theta=\cos^{-1}\{[(R+h)\sin\beta]/d\} \quad (2)$$

$$d=[R^2+(R+h)^2-2R(R+h)\cos\beta]^{1/2} \quad (3)$$

$$\beta=\cos^{-1}(\cos\phi\cos\Delta\lambda) \quad (4)$$

In the equations 2–4, R is the radius of the Earth of the Earth and h is the height of the satellite orbit above the surface of the Earth. The azimuthal pointing direction 44 clockwise from the direction of true North can be computed according to the equation, an equation 5, and a table 2.

$$\gamma = \cos^{-1}(\tan\phi\cot\beta) \quad (5)$$

TABLE 2

DETERMINATION OF AZIMUTH FROM γ

| Azimuth | Quadrant of local antenna |
|---|---|
| 180° − γ | NW |
| 180° + γ | NE |
| γ | SW |
| 360° − γ | SE |

In the equation 5,$\phi$ is the latitude of the local antenna 12. In the table 2, the quadrant of the local antenna 12 is identified with respect to the meridian passing through the subsatellite point.

An optional pitch inclinometer 62 mounts to the mobile platform 14 for sensing a pitch angle about a pitch axis 64 (FIG. 3*a*) that is horizontal and perpendicular to the reference axis 30. An optional roll inclinometer 66 mounts to the mobile platform 14 for sensing a roll angle about a roll axis 68 (FIG. 3*a*) that is horizontal and perpendicular to the pitch axis 64. In applications where the mobile platform 14 has a pitch or roll that is large compared to the vertical angle of the radiation pattern of the local antenna 12 the antenna aiming apparatus 10 uses the three-dimensional embodiment. In general, the horizontal rotation angle 46 and the vertical rotation angle 56 of the local antenna 12 must be changed to compensate for pitch and roll angles. The relative angle code 36 optionally includes an axis transformation algorithm using the pitch and/or roll angles for converting the azimuthal pointing direction 44 to the horizontal rotation angle 46. When pitch and/or roll angles are used, the antenna rotator servo-mechanism 11 rotates the local antenna 10 in an adjusted plane that intersects the horizontal plane 55 by those angles. Similarly, the relative angle code 36 uses the pitch and roll angles for converting the elevation pointing direction 54 to the elevation rotation angle 56 in a plane that includes the azimuthal pointing direction 44 and is perpendicular to the adjusted plane of the horizontal rotation angle 46.

Several compasses for use as the compass 28 are commercially available including a model FGS1/COB_05 from Fraunhofer Institute, Microelectronic Circuits and Systems of Dresden, Germany; a model APS533 from Applied Physics Systems of Mountain View, Calif.; and a model KVHC100 from KVH Industries, Inc. of Middletown, R.I. In some instances the performance of the antenna aiming apparatus 10 will be improved by providing gimbals for the compass 28. Inclinometers for use as the pitch and roll inclinometer 62 and 66 are available in several models from several sources including an LSO series from Schaevitz Sensors of Lucas Control Systems having a North American Operations in Hampton, Va.; and an LCI series from Jewell Electrical Instruments of Manchester, N.H. A combination of a compass for use in the compass 28 and dual inclinometers for use in the inclinometers 62 and 66 is a model TCM1 from Precision Navigation, Inc. of Mountain View, Calif. GPS receivers for use as the GPS receiver 26 are available from many sources including models 2000A, NT200, and Palisade from Trimble Navigation Limited of Sunnyvale, Calif.; and several models from Garmin International of Olathe, Kans. The local antenna 12 can use a parabolic dish reflector, a multi-element array, a horn, or the like.

Figure 2:
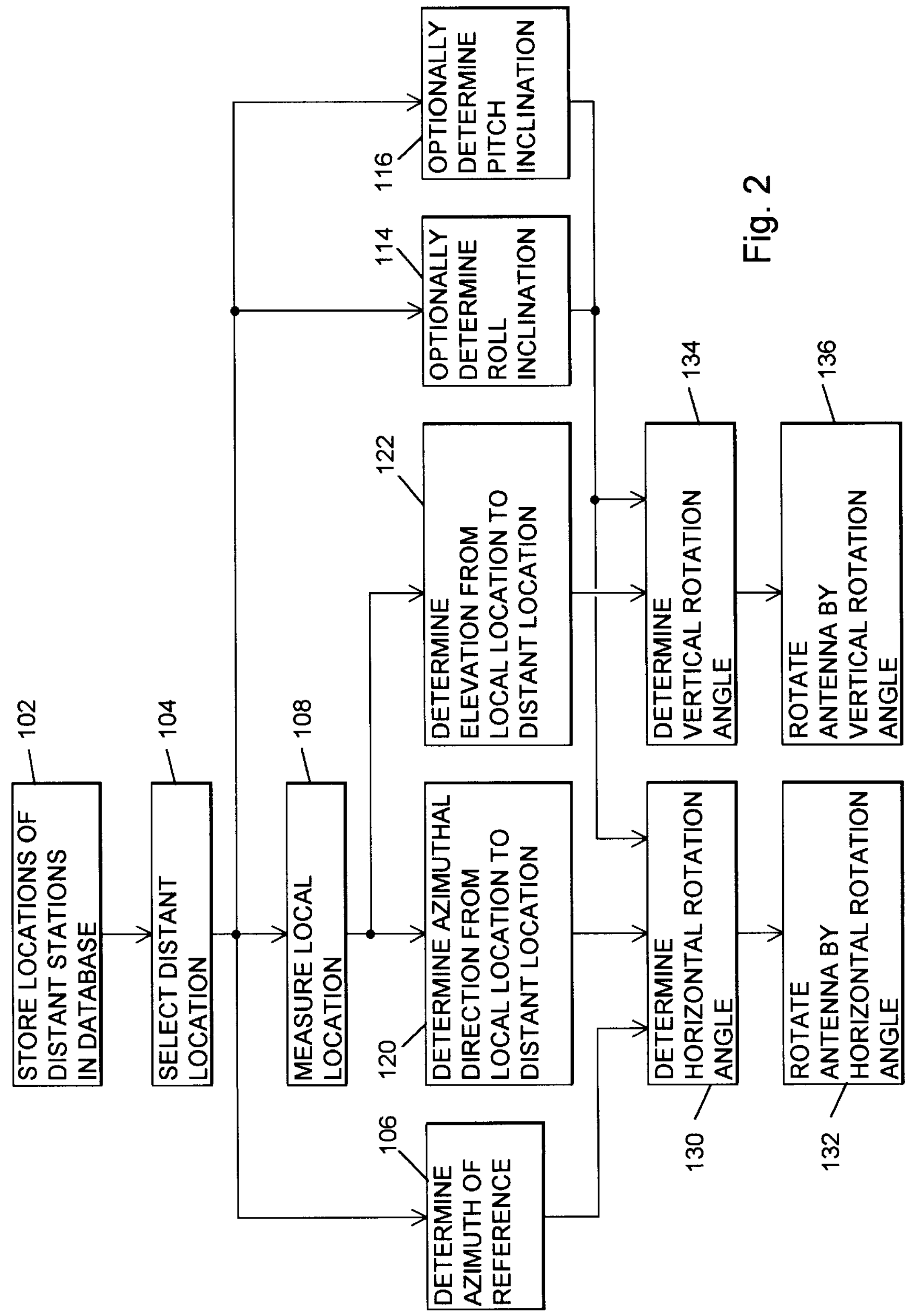
FIG. 2 is a flow chart of a method for aiming an antenna using the antenna aiming apparatus of FIG. 1.

FIG. 2 is a flow chart of a method using the antenna aiming apparatus 10 for aiming the local antenna 12. In a step 102, a user enters the latitude and longitude or latitude, longitude, and altitude of distant locations of transmit stations from which it is desired to receive signals and/or receive stations to which it is desired to transmit signals. In a step 104 the user selects a particular one of the distant locations. In a step 106 the compass 28 determines the azimuth of the reference axis 30. In a step 108 the GPS receiver 26 determines the local location. In an optional step 114 the roll inclinometer 66 determines the roll of the platform 14. In an optional step 116 the pitch inclinometer 62 determines the pitch of the platform 14. The steps 106, 108, 114, and 116 may be performed in any order or in parallel provided that they are performed rapidly compared with the motion of the platform 14.

In a step 120 the azimuthal pointing direction 44 from the local antenna 12 to the distant location is determined from the local and distant locations. In a step 122 for three-dimensional operation, the elevation pointing direction 54 is determined from the local and distant locations and Earth curvature. In a step 130 the horizontal or azimuthal rotation angle 46 is determined from the azimuth of the reference axis 30 and the azimuthal pointing direction 44. Optionally, the horizontal rotation angle 46 includes compensation for the pitch and roll angles. In a step 132 the antenna rotator servo-mechanism 11 rotates the local antenna 10 to the horizontal rotation angle 46 with respect to the reference axis 30. In a step 134 the vertical or elevation rotation angle 56 is determined from the reference elevation of the reference axis 30 (typically assumed to be horizontal) and the elevation pointing direction 54. Optionally, the vertical rotation angle 56 includes compensation for the pitch and roll angles. In a step 136 the antenna rotator servo-mechanism 11 rotates the local antenna 10 to the vertical rotation angle 56 with respect to the horizontal plane.

Figure 3B:
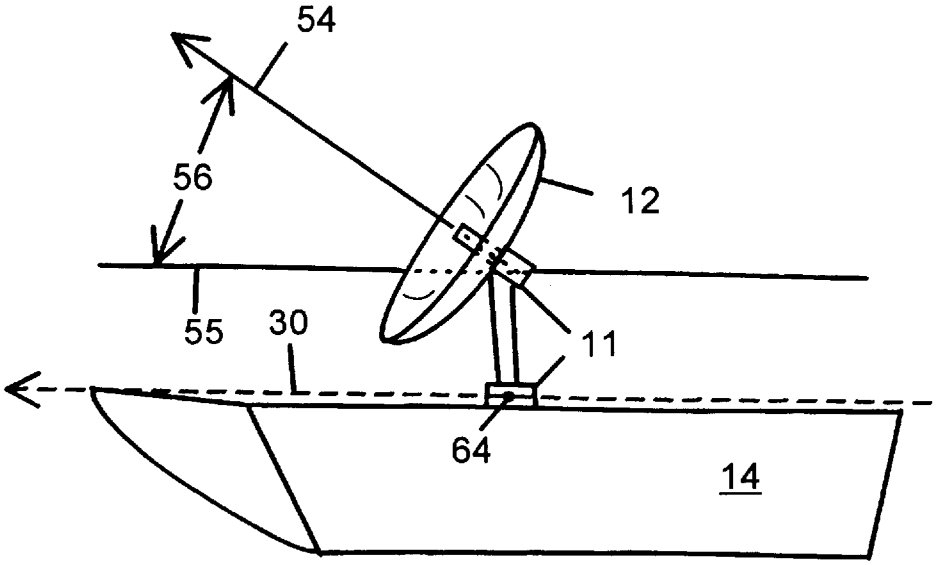
FIGS. 3*a* and 3*b* are top and side views, respectively, showing geometric relationships for the antenna aiming apparatus of FIG. 1.
Figure 3A:
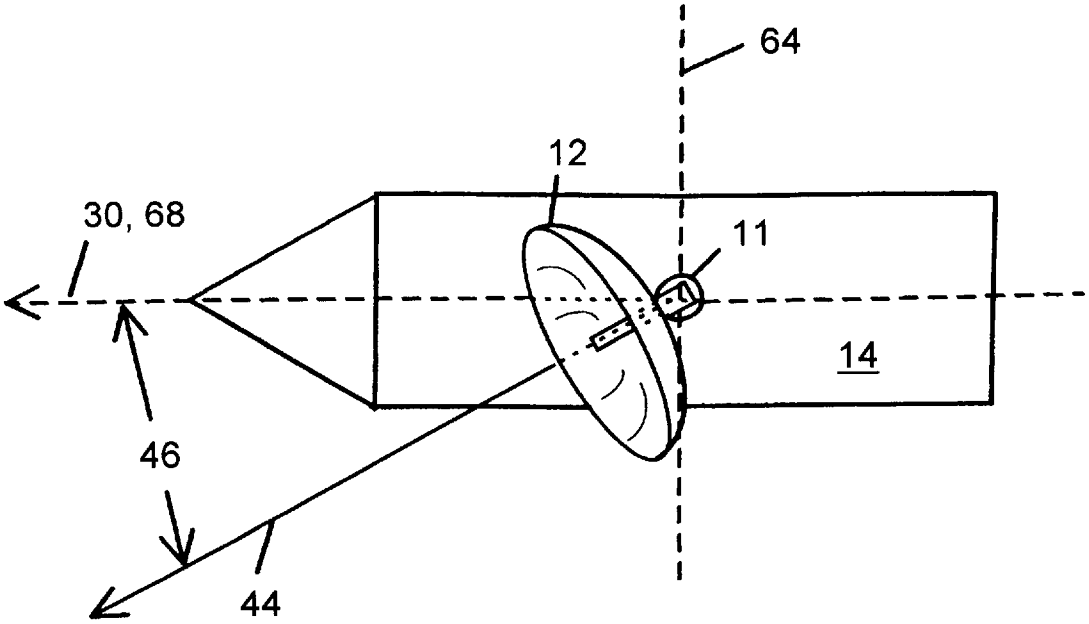

FIGS. 3*a* and 3*b* are top and side views, respectively, showing the geometric relationships for the antenna aiming apparatus 10. The antenna 12 mounts on the rotator 11 which mounts on the mobile platform 14. The mobile platform 14 is shown as a boat having the reference axis 30, the pitch axis 64, and the roll axis 68. FIG. 3*a* shows the local antenna 12 at the horizontal rotation angle 46 with respect to the reference axis 30 for aiming the local antenna 12 to azimuthal pointing direction 44 and FIG. 3*b* shows the local antenna 12 at the vertical rotation angle 56 with respect to the horizontal plane 55 for aiming the local antenna 12 to the elevation pointing direction 54.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for automatically pointing an antenna to a distant location, comprising steps of:

storing data for said distant location;

determining a reference azimuth for said antenna;

determining a local location;

computing a pointing azimuth from said local location to said distant location;

computing an azimuthal rotation angle between said pointing azimuth and said reference azimuth; and rotating said antenna to said azimuthal rotation angle with respect to said reference azimuth for pointing said antenna to said distant location.

2. The method of claim 1, wherein:

the step of determining said reference azimuth includes a step of using a magnetic compass for sensing the Earth's magnetic field for determining said reference azimuth.

3. The method of claim 1, further comprising steps of:

determining at least one of (i) a roll angle for said antenna in a vertical plane perpendicular to said reference azimuth and (ii) a pitch angle for said antenna in a vertical plane parallel to said reference azimuth; and wherein:

the step of computing said azimuthal rotation angle includes compensating said azimuthal rotation angle for an effect of said one of (i) said roll angle and (ii) said pitch angle.

4. The method of claim 1, further comprising steps of:

determining a pointing elevation from said local location to said distant location;

computing an elevation rotation angle between said pointing elevation and a reference elevation; and rotating said antenna to said elevation rotation angle for pointing said antenna to said distant location.

5. The method of claim 4, further comprising steps of:

determining at least one of (i) a roll angle for said antenna in a vertical plane perpendicular to said reference azimuth and (ii) a pitch angle for said antenna in a vertical plane parallel to said reference azimuth; and wherein:

the step of computing said elevation rotation angle includes compensating said elevation rotation angle for an effect of said one of (i) said roll angle and (ii) said pitch angle.

6. The method of claim 1, wherein:

said distant location is a location of a television transmitter.

7. The method of claim 1, wherein:

said distant location is a location of a satellite.

8. The method of claim 1, wherein:

said distant location is a location of a communication receiver.

9. The method of claim 1, wherein:

the step of determining said local location includes a step of using a global positioning system (GPS) receiver for determining said local location.

10. An apparatus for automatically pointing an antenna to a distant location, comprising:

a memory for storing data for said distant location;

a rotator for rotating said antenna according to an azimuth rotation angle;

a compass for determining a reference azimuth for said antenna;

a locator for determining a local location;

a point-to-point direction code for execution by a processor for computing a pointing azimuth from said local location to said distant location; and a relative angle code for execution by said processor for using said pointing azimuth and said reference azimuth for computing said azimuth rotation angle for rotating said antenna for pointing said antenna to said distant location.

11. The apparatus of claim 10, wherein:

the compass includes a magnetic compass for sensing the Earth's magnetic field.

12. The apparatus of claim 10, further comprising:

a roll inclinometer for determining a roll angle for said antenna in a vertical plane perpendicular to said reference azimuth; and a pitch inclinometer for determining a pitch angle for said antenna in a vertical plane parallel to said reference azimuth; and wherein:

the relative angle code is further for compensating said azimuthal rotation angle for said roll angle and said pitch angle.

13. The apparatus of claim 10, wherein:

the rotator is further for rotating said antenna according to an elevation rotation angle;

the point-to-point direction code is further for computing a pointing elevation from said local location to said distant location; and the relative angle code is further for using said pointing elevation and a reference elevation for computing said elevation rotation angle for rotating said antenna for pointing said antenna to said distant location.

14. The apparatus of claim 13, further comprising:

a roll inclinometer for determining a roll angle for said antenna in a vertical plane perpendicular to said reference azimuth; and a pitch inclinometer for determining a pitch angle for said antenna in a vertical plane parallel to said reference azimuth; and wherein:

the relative angle code is further for compensating said elevation rotation angle for said roll angle and said pitch angle.

15. The apparatus of claim 10, wherein:

said distant location is a location of a television transmitter.

16. The apparatus of claim 10, wherein:

said distant location is a location of a satellite.

17. The apparatus of claim 10, wherein:

said distant location is a location of a communication receiver.

18. The apparatus of claim 10, wherein:

the locator includes a global positioning system (GPS) receiver.

* * * * *